G. W. MacKENZIE, Jr.
ADJUSTABLE STOP MECHANISM FOR LIQUID DISPENSING APPARATUS.
APPLICATION FILED NOV. 12, 1917.

1,326,207.

Patented Dec. 30, 1919.

WITNESSES
J. M. Geoghegan.
Lois Urieman.

INVENTOR
George W. MacKenzie Jr.
by C. M. Clarke
his attorney

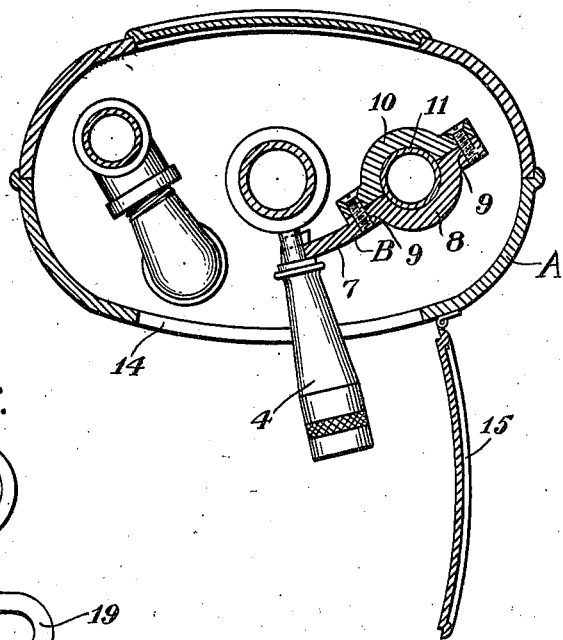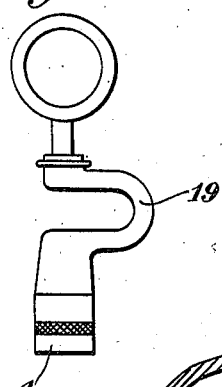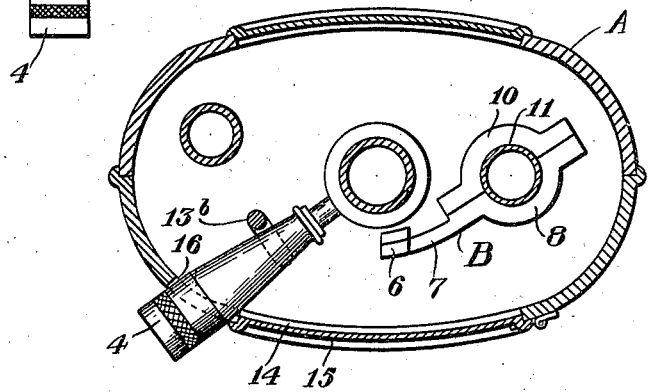

UNITED STATES PATENT OFFICE.

GEORGE W. MacKENZIE, JR., OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

ADJUSTABLE STOP MECHANISM FOR LIQUID-DISPENSING APPARATUS.

1,326,207.  Specification of Letters Patent.  Patented Dec. 30, 1919.

Application filed November 12, 1917. Serial No. 201,686.

*To all whom it may concern:*

Be it known that I, GEORGE W. MACKENZIE, Jr., a citizen of the United States, residing at Beaver, in the county of Beaver and State of Pennsylvania, have invented certain new and useful Improvements in Adjustable Stop Mechanism for Liquid-Dispensing Apparatus, of which the following is a specification.

My invention relates to adjustable stop mechanism for liquid dispensing apparatus for delivering gasolene or other liquids in measured quantities from a measuring tank connected with a reservoir.

The invention herein described is adapted particularly for use on apparatus similar to that described in Patent No. 1,242,831 granted to James A. MacKenzie and George W. MacKenzie, Jr., October 9th, 1917, in which the liquid is caused to flow into a secondary or measuring tank by the creation of a partial vacuum therein. A central vertically adjustable conduit extends upwardly into the secondary or measuring tank and is in communication with a storage vessel or other source of supply.

The vertically adjustable conduit may be set to predetermined positions only by means of a handle secured thereon which is adapted to partially rotate and raise or lower such conduit as desired, and to be secured in predetermined positions in individually adjustable stop members within the standard. When the adjustable conduit is set to the selected position, air exhausting mechanism is set in motion, thereby exhausting the air from the secondary tank and creating a partial vacuum which will cause the liquid to flow into the measuring tank through the adjustable conduit until the air exhausting mechanism is stopped. Suitable indicia are provided on the preferably transparent measuring tank and the amount of liquid therein, controlled by the level of the upper terminal of the conduit after return by overflow of any surplus, may be readily ascertained by observation. A suitable discharge outlet is also provided in such a position on the measuring tank that all the liquid must flow out therethrough.

The principal object of the present invention is to so construct the stop mechanism that its units may be readily adjusted to different positions to compensate for varying dimensions of the measuring tank or other irregularities in the construction of the apparatus.

A further and important object of this invention is to provide a stop mechanism which will avoid mistakes, in that it presents a practically continuous face or surface to the handle of the adjustable conduit, with the exception of the recesses provided for the reception of such handle, thus preventing any means of retaining the handle in an unauthorized position.

While I have shown and described my invention as pertaining to measuring and dispensing apparatus, it will be understood that I do not wish to limit myself to this particular use, but that the invention may be used wherever such construction is desired. It will also be understood that I do not wish to be limited to the exact construction shown since various changes in design, arrangement, or detail may be made within the scope of the appended claims.

In the drawings, showing one preferred construction:—

Fig. 3 is a cross sectional view through the standard on the line III, III, Fig. 1, showing the handle on the conduit in engaged position in a recess in one of the adjustable stop members.

Fig. 4 is a like view on the line IV, IV, Fig. 1, showing the hinged closure on the front of the casing closed and the adjusting handle out of engagement with the stop members and locked in such position by the hinged closure.

Figs. 5 and 6 are detail views showing means of providing clearance for the handle of the main conduit.

Figure 1:
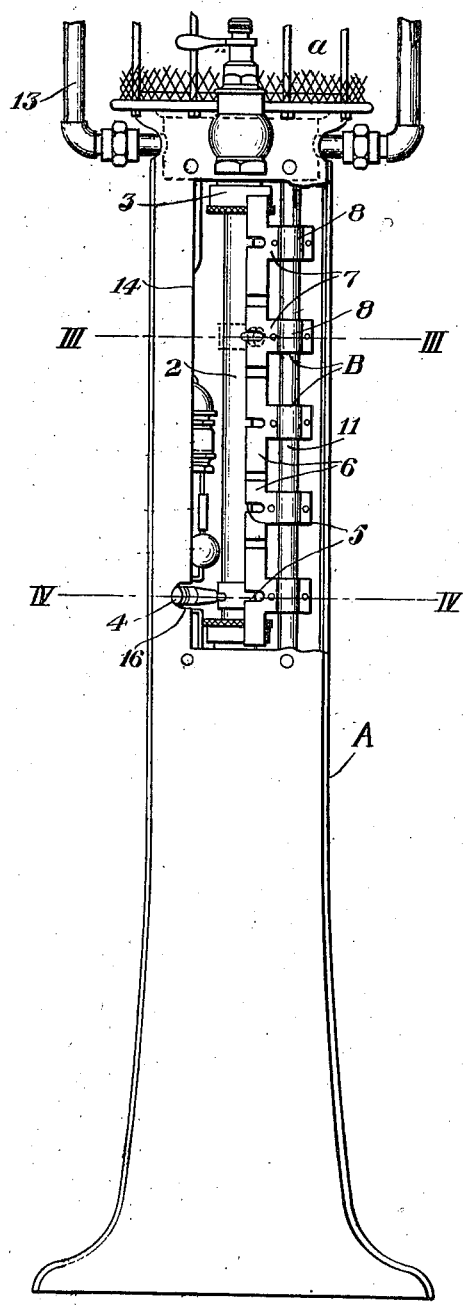
Figure 1 is a front elevation of an apparatus embodying my invention having a portion of the casing broken away to show the application of the present invention, and having the measuring tank and its respective parts broken away.
Figure 2:
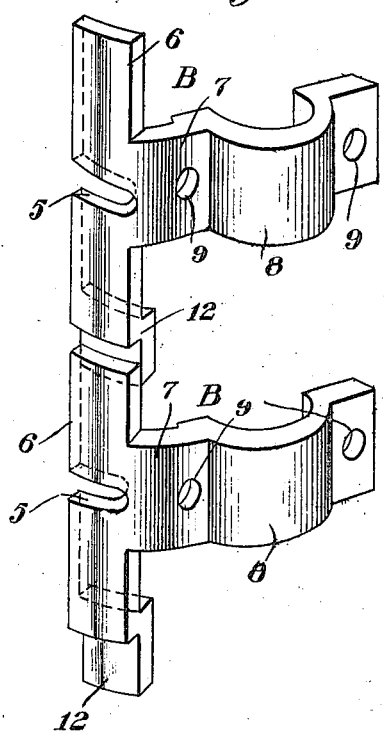
Fig. 2 is an enlarged detail view of two of the stop members as assembled, showing their detail formation.

Referring more particularly to the drawings, the letter A designates the tubular supporting standard or casing of the apparatus. The measuring tank $a$, of which only the bottom portion is shown in the present drawings, is secured to the upper end of the standard A.

A vertically adjustable conduit 2 extends upwardly through the standard A from a storage vessel (not shown) and passes through a suitable stuffing box 3 into the measuring tank *a*. Conduit 2 is adapted to be raised or lowered and partially rotated by the fixedly connected handle 4, and to be held in predetermined positions by engaging the handle 4 in one of the slots or recesses 5 in sectional bars 6 of the stop members B.

Members B are substantially T-shaped and comprise a body or shank portion 7 extending at right angles from the bars 6, having a semi-cylindrical clamping portion 8 formed therein, and having holes 9 at each side of the portion 8 for the reception of clamping bolts or screws. A co-acting clamping strap piece 10 is adapted to be secured to the shank 7 by screws passing through the holes 9 to hold the stop members B upon wire conduit 11 or other member within the standard A. I prefer to mount the stop members B on the conduit 11 since such conduit is a customary part of the apparatus and by mounting the stops B thereon it serves a double purpose, thus reducing the number of parts and cost of manufacture.

The shank 7 between the bars 6 and the clamping portion 8 is preferably slightly curved, as are also the bars 6, to facilitate the engaging of the handle in the recesses 5 in the bars 6, in its circular swinging movement.

As will be noted from the drawings, stop members B are each of identical construction, the one end of each bar 6 being off-set as at 12 to effect over-lapping of the ends, thereby providing a continuous edge bearing between the notches 5 and a substantially flush front face throughout the series.

The interfitting adjustable feature of the bars 6 of stops B is of advantage for the reason that it is sometimes impossible to make the cylindrical measuring tank *a* of the same proportions throughout. It is therefore desirable to adjust the different stops B independent of each other, and the over-lapping connections avoid the presence of spaces between them which might make it possible to insert the handle 4 therein, either purposely or accidentally, and thus give short measure. When formed with the overlap they present a continuous surface for the recesses 5 and thus insure correct location of the handle 4 with respect to the quantity of liquid desired.

A partial vacuum is formed in the tank *a* by exhausting the air therein through the pipe 13 having suitable valve and operating mechanism, as described in Patent No. 1,242,831, heretofore referred to, thereby permitting the upward flow of liquid through the conduit 2 from the storage vessel.

Figure 5:
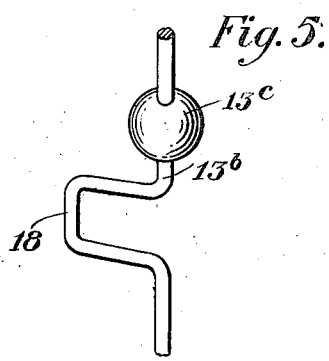

The tubular standard A has an opening 14 formed in its front face closed by a hinged door 15. Handle 4 is of such length as to project an appreciable distance through opening 14, and the casing A has a recess 16 formed therein adjacent the lower end of the opening 14 for the reception of the handle 4, when the door 15 is closed. When it is desired to close the door 15 the handle 4 is disengaged from the recess 5 and is then turned to the left and lowered to register with the recess 16 and inserted therein. The door is then closed and firmly engages the handle 4, thus preventing its use. Recess 16 is purposely located at a position corresponding to the lowermost position of conduit 2, thus insuring draining of any surplus in tank *a* as the door 15 cannot be closed until handle 4 is in registering engagement with the recess. The rod 13$^b$ if straight would interfere with the handle 4 when closing door 15 unless suitable clearance was provided, and this may be done either by off-setting the rod as at 18, Fig. 5, or by off-setting the handle as at 19, Fig. 6.

It will be noted that since all the working parts of the apparatus are within the casing or standard A, by closing the door 15 any unauthorized use of the device is prevented.

Having thus described my invention, what I claim is:—

1. Stop mechanism for a machine of the class described consisting of a plurality of independently adjustable locating elements each having a receiving recess for a locking handle.

2. Stop mechanism for a machine of the class described consisting of a plurality of independently adjustable locating elements each having a receiving recess for a locking handle, and so connected as to provide a continuous bearing edge for the handle between the recesses.

3. In combination with a vertically adjustable conduit having a laterally movable handle, a supporting standard, and a series of independently adjustable stop units mounted thereon each having a receiving recess for the handle.

4. In combination with a vertically adjustable conduit having a laterally movable handle, a supporting standard, and a series of independently adjustable stop units mounted thereon each having a receiving recess for the handle, and an interfitting engagement with the next adjacent unit whereby to provide a substantially continuous bearing for the handle between adjacent recesses.

5. In a dispensing apparatus of the class described, the combination with an adjustable conduit having a handle thereon, of a selective stop mechanism comprising a plurality of adjustable T-shaped members having recesses therein for the reception of said handle, said members being so arranged upon a standard as to overlap, thus presenting a continuous surface with the exception of said recesses, and means for detachably securing said members on said standard.

6. In a dispensing apparatus of the class described, the combination with an adjustable conduit having a handle thereon, of a selective stop mechanism comprising a plurality of adjustable T-shaped members, said members comprising a shank portion and a bar portion extending at right angles thereto and having a recess therein for the reception of said handle, said members being adjustably arranged upon a standard within said apparatus and in overlapping engagement with each other, and means for detachably securing said members on said standard.

7. In combination with a dispensing apparatus comprising a hollow standard, a measuring tank, a vertically adjustable conduit leading from a source of supply upwardly through said standard and entering said measuring tank, a handle on said conduit, and means for causing a partial vacuum in said measuring tank to induce a flow of liquid; of a stop mechanism comprising a plurality of T-shaped members, said members each comprising a shank portion and a bar portion extending at right angles thereto and having a recess therein for the reception of said handle, said members being adjustably arranged upon a standard within said apparatus and in overlapping engagement with each other, and means for detachably securing said members on said standard.

8. In a liquid dispensing apparatus of the class described, the combination with an adjustable conduit having a handle thereon, of a selective stop mechanism mounted upon a vertical standard comprising a plurality of vertically adjustable stops having recesses therein for the reception of said handle, and so arranged as to present a continuous surface to the handle except for said recesses.

9. In a liquid dispensing apparatus of the class described, the combination with an adjustable conduit having a handle thereon, of a selective stop mechanism mounted upon a vertical standard comprising a plurality of vertically adjustable stops having recesses therein for the reception of said handle and so arranged upon said standard that their ends overlap at all times, thereby presenting a continuous surface to said handle except for said recesses.

10. In a liquid dispensing apparatus of the class described, the combination with an adjustable conduit having a handle thereon, of a selective stop mechanism mounted upon a vertical standard, said mechanism comprising a plurality of vertically adjustable T-shaped stops each having a recess therein for the reception of said handle and so arranged as to have their ends overlap thereby presenting a continuous surface to said handle except for said recesses.

In testimony whereof I hereunto affix my signature.

GEORGE W. MACKENZIE, JR.